(A)

(B)

(C)

(D)

$\theta$mech (degree)

United States Patent Office 3,524,092
Patented Aug. 11, 1970

3,524,092
SYNCHRONOUS MOTOR
Takeshi Miyazaki, Shinsaku Kajita, and Tatsunosuke Inoue, Hitachi-shi, Japan, assignors to Hitachi, Ltd., Tokyo-to, Japan
Continuation-in-part of application Ser. No. 567,493, July 25, 1966. This application July 20, 1967, Ser. No. 654,921
Claims priority, application Japan, July 23, 1965, 40/44,124
Int. Cl. H02k *1/22, 21/04*
U.S. Cl. 310—163        11 Claims

ABSTRACT OF THE DISCLOSURE

A synchronous motor having a smooth rotor of magnetic material which is provided, by means of magnetic annealing treatment, with the particular arrangement of easy magnetization axes of magnetic domains of magnetic anisotropy to produce such magnetic saliency in the rotor as comparable to salient poles in a reluctance motor whereby the motor has a combined torque characteristic of a hysteresis motor and a reluctance motor.

---

This application is a continuation-in-part of copending application Ser. No. 567,493 for "A Hysteresis Motor," filed on July 25, 1966, now abandoned.

The present invention relates to a synchronous motor and, more particularly, to a synchronous motor of the hysteresis type with a smooth rotor whose operational characteristics are such that it possesses both reluctance motor characteristics and hysteresis motor characteristics, and combines the merits of both.

Motors of the smooth rotor type possess the merit of low noise characteristics during their operation. Motors having a smooth rotor made of steel in the usual manner, however, are not in wide spread use because of their known drooping speed-torque characteristic curve except where their large torque at a large slip can be utilized as a torque motor. In contrast, a motor having a smooth rotor made of a magnetic alloy of high coercivity generates a constant torque throughout from starting to synchronous speed if the induction torques due to eddy currents on the rotor are small enough to be neglected. Because of this constant torque and low noise characteristic, motors of this type are in a wide spread use as a hysteresis motor or a hysteresis synchronous motor in automatic control devices, audio devices, and many other applications.

Theoretically speaking, the torque of a hysteresis motor is proportional to the energy represented by the area of the hysteresis loop of the magnetic material comprising the ring or cylindrical rotor. From the above property, it would appear that a magnetic alloy of large hysteresis loop area is preferred; however, the hysteresis loop area is in practice limited in self-starting alternating machines to such an amount that its coercive force is about 50 to 250 oersteds. In view of this magnitude of the coercive force, isotropic magnetic alloy materials have been used heretofore in fabricating hysteresis rotors.

Although hysteresis motors have many advantages as synchronous machines, as previously pointed out, they also have certain disadvantages such as small output power and low efficiency as compared with reluctance motors or induction synchronous motors of comparable size. To take out the same output power, therefore, requires a larger size hysteresis motor than a reluctance or other motor, and thus becomes more expensive for use in any particular application. On the other hand, since reluctance motors have squirrel cage windings and salient poles made of laminated iron plates, it inevitably produces noises during rotation such as magnetic noises. For this reason, reluctance motors cannot be used in applications where low noise is a requirement.

The object of the present invention is to provide a synchronous motor of high efficiency in which the constant torque characteristics of hysteresis motors throughout the asynchronous and synchronous operation mode is further combined with the desirable characteristics of reluctance motors which contribute to high output power in reluctance motors.

Another object of the invention is to provide a synchronous motor of this character in which the combined operational characteristics of a hysteresis motor and a reluctance motor is attained in a smooth rotor without employing compound rotor techniques, i.e., mechanical combination of a hysteresis rotor and a reluctance rotor. An example of such compound rotor techniques is disclosed in the U.S. Pat. No. 3,068,373.

Still another object of the invention is to provide a synchronous motor of the above character which has a single ring or cylindrically-shaped smooth rotor including anisotropic portions, that is, the particular arrangement of easy magnetization axes of magnetic domains therein. These and other objects and particularities of the invention will be apparent from the following detailed description when taken with reference to the accompanying drawings, in which.

Throughout the above drawings like reference numerals or characters are used to denote like parts or devices.

Figure 1:
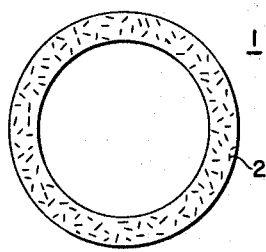
FIG. 1 is a sectional view of a known construction for a ring or cylindrical rotor used in a known hysteresis motor.

There are a number of known hysteresis motors which have rotors made of isotropic magnetic material as pointed out hereinbefore. In FIG. 1, 1 is a rotor made of an isotropic magnetic alloy in which the so-called easy magnetization axes 2 of magnetic domains are randomly arrayed and are not arranged to point to a certain direction, and therefore, is equally magnetizable in any direction by an applied magnetomotive force. Because of its smooth configuration and the above character hysteresis motors having rotors of this type pull into synchronism at any peripheral position of the rotor relative to the stator poles.

In a synchronous motor according to the invention, a ring or cylindrical rotor member made of a magnetic alloy of high coercivity, is provided and possesses magnetic anisotropy so as to produce so-called magnetic saliency therein. The inventors have found that this magnetic saliency functions similarly to salient poles in a reluctance motor and provides reluctance motor characteristics.

Figure 2:
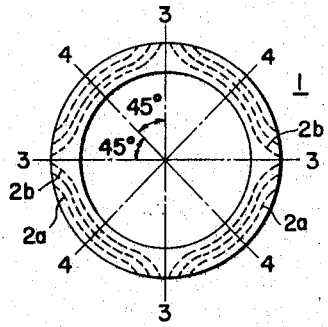
FIG. 2 is a sectional view of a ring or cylindrical rotor member having anisotropic portions therein for use in a synchronous motor of the hysteresis type according to the invention.

As shown in FIG. 2, a cylindrical rotor member 2 according to the invention, is provided with easy magnetization axes 2a, 2b of magnetic domains so arranged that the rotor member is readily magnetizable in the 3—3 direction with an outside magnetic field but is not readily magnetizable in the 4—4 direction. In FIG. 2, most of the easy magnetization axes in the peripheral portions of the cylinder member 2 are placed to point to the circular direction as shown at 2a, but the easy magnetization axes in the vicinity of diametrically opposite parts on the periphery along the 3—3 direction are made to point to or to have a component in the radial directions as shown at 2b.

As a result of the above described fabrication, the rotor 2 is provided with such magnetic anisotropy as shown in the figure and can be said to possess so-called magnetic saliency formed by shaping the rotor in the 3—3 directions due to the fact that this magnetic anisotropy functions like salient poles of a reluctance motor rotor. In a reluctance motor having a salient pole rotor, magnetic flux produced by stator coils can easily pass through the rotor through the poles thereof during rotation during the instant that the rotor poles come opposite to the corresponding stator poles. However, magnetic flux from the stator coils can hardly pass through the rotor because of increased reluctance due to enlarged air gaps when the corresponding stator poles are positioned in between the rotor poles. From the above explanation it will be apparent that the magnetic anisotropy of the rotor shown in FIG. 2 functions like salient poles in a reluctance motor. Accordingly, this magnetic anisotropy is called magnetic saliency in that it compares to physical saliency in a known reluctance rotor, and will exhibit similar characteristics. Hence in the 3—3 directions magnetic flux from the stator coils can readily pass through the rotor 2, while in between the rotor exhibits an increased reluctance.

Figure 3:
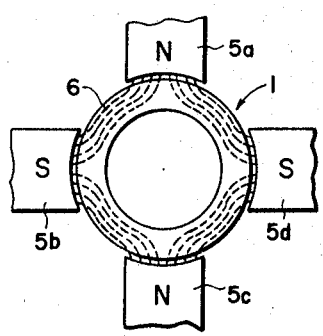
FIG. 3 is a schematic view illustrating a rotor subjected to magnetic annealing treatment or field cooling comprising a part of the manufacture of a rotor which includes anisotropic portions as shown in FIG. 2.

For manufacturing a rotor having magnetic anisotropy in the above described fashion, a magnetic alloy is used which becomes anisotropic by magnetic annealing treatment. For example, alnico alloys, especially alnico V, shows this magnetic annealing effect. A ring or cylindrical rotor member made of one of these magnetic alloys is first heated up to the solution treatment temperature (1,150° C.–1,250° C.) and is next cooled under the influence of a magnetic field. By this treatment a portion of the rotor will be provided with magnetic anisotropy. To obtain a rotor having such magnetic anisotropy as shown in FIG. 2 a device constructed in the manner shown in FIG. 3, is used to give a stationary magnetic field as shown by the dotted lines. In FIG. 3, a magnetic alloy ring or cylinder member of suitable dimensions for a smooth rotor, is disposed in the manner shown in the stationary magnetic field so as to accomplish the magnetic annealing effect. 5a, 5b, 5c, and 5d are magnetic poles to provide a magnetic field of proper strength and configuration to form the flux distribution shown at 6 in the rotor. The four poles 5a–5d are angularly displaced by 90° with respect to one another around the rotor with as small a gap as practicable between the pole tips and the rotor and are alternately north and south poles.

Annealing the rotor under the influence of an applied magnetic field having the above configuration produces magnetic anisotropy in the rotor as shown in FIG. 2 in which easy magnetization axes of magnetic domains in the cylinder member 2 are arranged to point in the direction of the applied magnetic field. In other words, so-called magnetic saliency is provided which compares to the four salient poles in a reluctance motor. For rotors fabricated from magnetic materials such as alloy selected from the group of alnico alloys, an applied magnetic field having a known strength above 300 (oersteds) is applied during the annealing treatment in order to effect the magnetic anisotropy. A subsequent aging or curing treatment is sometimes preferred which is to heat or maintain the magnetic alloy at about 570° C.–620° C. after the magnetic annealing. By this aging or curing treatment nuclei of precipitations produced during the annealing are made to grow and thus the coercivity of the magnetic alloy can be increased. From the above description it will be appreciated that the magnetic characteristics of the rotor or a degree of the magnetic anisotropy can be adjusted by controlling cooling speed in the magnetic annealing treatment, strength of the magnetic field, or the aging temperatures.

The reluctance characteristic of the rotor which is caused by the magnetic anisotropy has an influence on the motor characteristics and is determined by the difference between magnetization characteristics of the rotor in the magnetization direction of the magnetic annealing treatment, and the magnetization characteristics in the other directions, for example, in the direction perpendicular to the direction of the magnetization. To manufacture a synchronous motor of desired characteristics, therefore, control of the degree of the magnetic anistropy of the rotor is very important.

As a self starting synchronous motor, an increase in the degree of the magnetic anisotropy strengthens the reluctance character of the motor, thus enlarges its pull-out torque. However, the increase impairs its torque characteristics during asynchronous operating periods and makes its pull-in torque small. These influences of the magnetic anisotropy on operational characteristics of the motor comprising the invention will be well understood when compared with influences of physical saliency on a reluctance motor.

Figure 4:
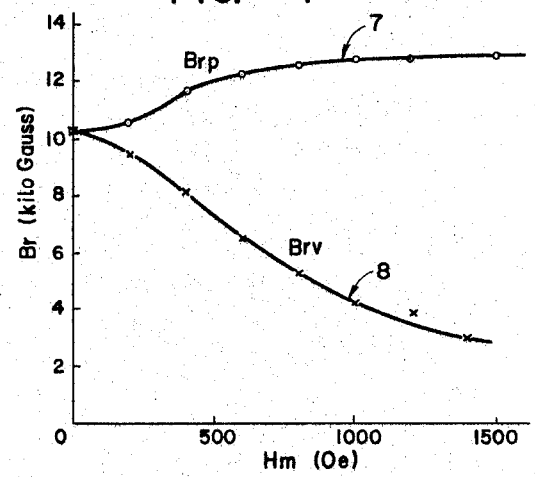
FIG. 4 shows characteristic curves of residual magnetic flux densities for the rotor of FIG. 2 in the direction of the magnetic field used for magnetic annealing and those in the direction perpendicular thereto; both being plotted against strengths of the applied magnetic field.

FIG. 4 shows experimental data relating to the difference between residual magnetic flux densities in the direction of an applied magnetic field for the magnetic anealing and those in a direction perpendicular thereto when the strength of the applied magnetic field to a sample is varied from zero to about 1,500 oersteds. The sample with which this data was derived was a square rod of alnico V alloy. Curve 7 shows the residual magnetic flux densities $Brp$ measured in the direction of the applied magnetic field, and curve 8 the residual flux densities $Brv$ measured perpendicularly thereto. The flux densities $Brp$ have a tendency to saturate as the strength $Hm$ of the magnetic field increases beyond 600 oersteds while the flux densities $Brv$ decrease considerably as $Hm$ increases. Therefore, the ratio $Brp/Brv$ which corresponds with the saliency in the reluctance motor, increases as $Hm$ increases.

Figure 9:
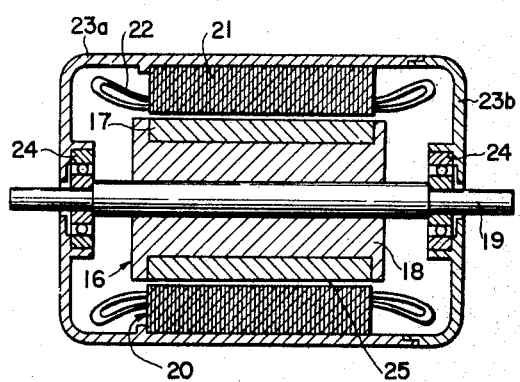
FIG. 9 is a sectional view of a synchronous motor constructed according to the invention.

FIG. 9 shows a sectional view of one embodiment of a synchronous motor according to the invention. In FIG. 9, 16 indicates a rotor which comprises an outer ring or cylinder member 17 of magnetic material having magnetic anisotropy therein, a supporting member 18 made of non-magnetic material such as aluminum, and a shaft 19. The rotor 16 is rotatably disposed in an enclosure composed of a casing 23a and a bracket 23b in which the shaft 19 is supported by respective bearings 24. A stator 20 of the same type used in known alternating current rotating machines, is supported within casing 23a and comprises a stator core 21 made of tooth punched laminated steel and poly-phase distributed windings 22. The stator 20 is secured to the casing 23a and surrounds the rotor 16 with a small air gap 25 therebetween.

The ring or cylinder member 17 is preferably made of an alnico alloy. In this embodiment an alnico alloy is used which consists of 8% (by weight) of aluminum, 14% of nickel, 24% of cobalt, 3% of copper, 0.5% of niobium, and the balance of iron. The ring member of this alloy may be made by casting and or working and has 48 millimeters in outer diameter, 36 millimeters in inner diameter, and 42 millimeters in length. After the ring member is heated to 1,280° C., it is magnetically annealed in the atmosphere at a cooling velocity of 2° C./s under a magnetic field of 1,500 oersteds having a four pole configuration as shown in FIG. 3. The measurement of magnetic characteristics of the rotor by providing a coil therearound showed that the residual magnetic flux density $B_{rp}$ in the peripheral direction is 11.6 (kgauss) the coercive force $H_c$ is 185 oersteds.

Figure 5:
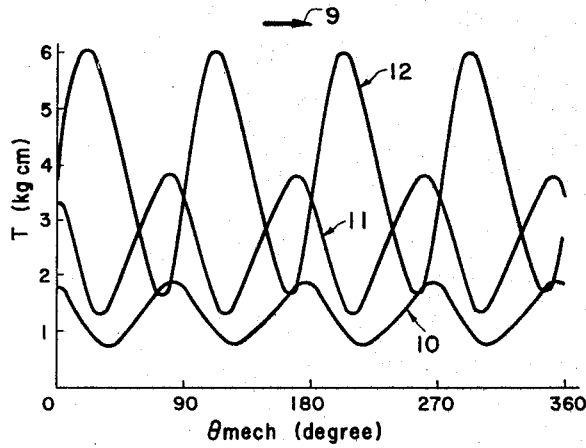
FIG. 5 shows the measured torque produced by a rotor such as shown in FIG. 2 having four pole magnetic anisotropy and which is rotated quasi-statically 360° in a four pole sinusoidal magnetic field.

To study combined torque characteristics of the motor according to this invention, actual torques are measured which are generated by the rotor of the above composition and treatment placed in a four pole stationary sinusoidal magnetic field and rotated quasi-statically therein. FIG. 5 shows the measured results in which the abscissa and the ordinate represents mechanical angles and torques, respectively. Curves 10, 11 and 12 show measured torques when the applied sinusoidal magnetic field is adjusted to have its maximum value of 178 (AT), 223 (AT), and 267 (AT), respectively. This data was obtained by use of a conventional measuring method where the torques needed to rotate the rotor forcibly from the outside were measured by a torque pick up device. Arrow 9 indicates that the direction of the rotation was from 0 to 360°.

It will be clear from FIG. 5 that the torque curves have a constant positive component and alternating or undulating components. These torque characteristic curves exhibit the combined characteristics of the constant torque of a hysteresis motor and the alternated torque of a reluctance motor in a synchronous motor according to the invention.

Figure 6:
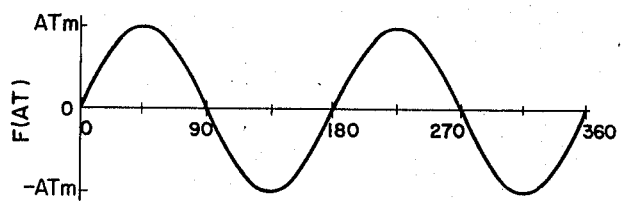
FIG. 6(A) shows a curve of a sinusoidal magnetic field.
FIGS. 6(B), 6(C), and 6(D) show torque curves of a reluctance motor, a hysteresis motor, and a synchronous motor with permanent magnet poles, respectively, to explain the distinguishing features and improved torque characteristics of a motor constructed according to this invention as shown in FIG. 5.
Figure 6:
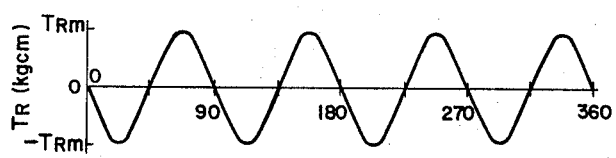
Figure 6:
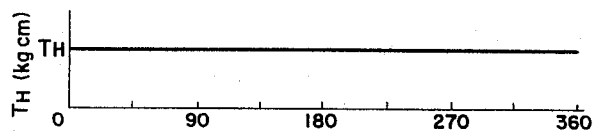
Figure 6:
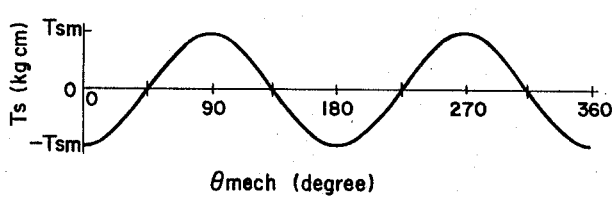

FIG. 6 illustrates explanatory torque characteristic curves of a reluctance motor, hysteresis motor, and a synchronous motor having exciting poles such as permanent magnets, assuming that all are four poles (two pairs of poles) machines. Mechanical angles are plotted as the absciss a in the figure. FIG. 6(A) shows a sine wave distribution of a magnetomotive force F and FIG. 6(B) shows reluctance torque $T_r$ generated by a salient pole type rotor which is disposed and rotated in a magnetic field such as shown in FIG. 6(A). The reluctance torque curve shown in FIG. 6(B) is characterized in that the alternating torques become zero at both the zero point and the maximum point of the applied magnetomotive force wave, and reach alternate positive and negative maximum values at points midway therebetween.

In a hysteresis motor having a smooth rotor of isotropic magnetic material, its torque $T_h$ is substantially constant regardless of the rotation angle of the rotor and is determined by properties of rotor material and an applied magnetic field as shown in FIG. 6(C).

From the foregoing explanations it will be apparent that the torque characteristic curves of a synchronous motor of the hyteresis type according to the invention is a combination of the constant torque characteristic of a hysteresis motor and an alternating torque characteristics of a reluctance motor and both characteristics are embodied in a single smooth rotor without employing complicated compound constructions. By the way, it will be noted in FIG. 5 that the difference in phase between reluctance components of curves 10, 11, 12 are caused by increased lags in phase due to magnetic hysteresis in accordance with increases in the magnetomotive force.

FIG. 6(D) shows a torque characteristic curve of a synchronous motor having exciting magnet poles such as permanent magnet poles. The torque curve varies with the same period as the magnetomotive force and lags the magnetomotive force by 90 electrical degrees (45 mechanical degrees). Therefore, it is believed apparent that the torque characteristic curve of the motor made possible by this invention is not a combination of that of a hysteresis motor and that of a synchronous motor having exciting magnet poles.

Although torque characteristics of the motors have been explained with respect to rotors placed in a stationary sinusoidal magnetic field, it will be appreciated that when used as alternating machines, the relation between the rotor and the magnetomotive force during synchronous operation corresponds to the relation between the stationary magnetic field and the rotor placed therein. Thus, the maximum torque set up by the motor according to this invention at about synchronous operation is far greater than that of known hysteresis motors of comparable size.

Table 1 is a comparison of the operational characteristic of a synchronous motor of this invention with that of a known hysteresis motor having a magnetically isotropic smooth rotor of the same size and of the same material. The measurement was made with respective motors of 3 phase 4 pole with an electrical source of 200 voltage, 50 cycles per second being applied.

TABLE 1

| Kind of rotor | Ordinary | Motor of this invention |
|---|---|---|
| Coercive force (oe.)* | 168 | 185 |
| Residual magnetic flux density (kg.)* | 10.8 | 11.6 |
| Starting torque (kg. cm.) | 3.3 | 4.5 |
| Pull out torque (kg. cm.) | 2.0 | 3.7 |
| Output power (w.) | 30.8 | 57.0 |
| Efficiency (percent) | 55.0 | 65.8 |

*Coercive forces and residual magnetic flux densities are average values measured along the periphery of the ring rotor member.

As shown in Table 1, the synchronous motor according to the invention has many advantages over the ordinary hysteresis motor in that the maximum output power increased by 85% and the starting torque increased by 36.4%.

Figure 7:
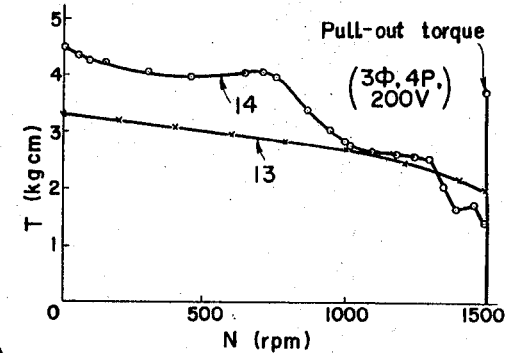
FIG. 7 shows speed-torque characteristics of a four pole motor having a rotor of four pole magnetic anisotropy according to the invention, compared with speed-torque characteristic of a known hysteresis motor having a rotor of isotropic magnetic material, both motors being of the same size and made of the same magnetic material.

FIG. 7 of the drawings shows the torque characteristic curves of the two motors mentioned with relation to Table 1, plotted against their speed when they are supplied with 200 volts. Curve 13 shows torque characteristics of the known hysteresis motor listed in Table 1 which has a smooth rotor of isotropic magnetic material. It produces the maximum torque at starting and the starting torque and running torque gradually decreases as its speed increases. Curve 14 shows the torque characteristics of a synchronous motor constructed in accordance with this invention. Because of its magnetic saliency due to the magnetic anisotropy of the rotor, the torque characteristic exhibits torque pulsation such as is found in reluctance motors and the torque characteristic curve becomes unsmooth and complicated. However, the curve is quite different from that of usual reluctance motors in that the motor according to the invention has positive torques of considerable amounts during asynchronous operations in the vicinity of the synchronous speed.

Figure 12:
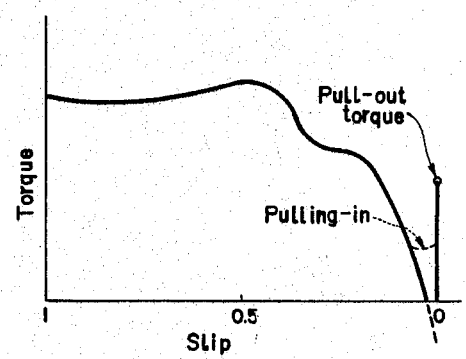
FIG. 12 is a simplified speed-torque characteristic curve of a known reluctance motor.

Generally speaking, reluctance motors are provided with squirrel cage windings and are operated as indication motors until they reach synchronous speed. During asynchronous operation in the vicinity of the synchronous speed, however, its fundamental induction torque is close to zero and its torques due to higher harmonics are negative. Therefore, the overall torque of the motor becomes negative as shown in FIG. 12. From the above description it will be appreciated that synchronous motors according to the present invention can be pulled into synchronism more readily than usual reluctance motors and that much safer operation with less noise as compared with known reluctance motors can be accomplished with a synchronous motor according to the invention.

Figure 8:
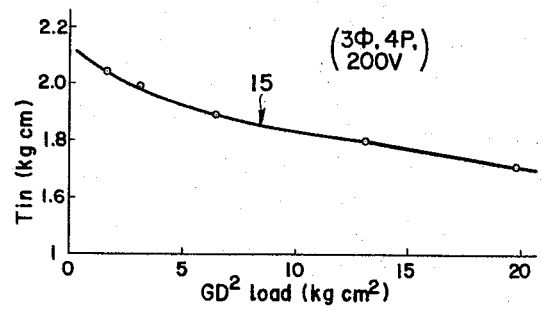
FIG. 8 shows a characteristic curve plotting pull-in torque of a synchronous motor according to the invention against moments of inertia of loads ($GD^2$ load)

Since the pull-in torques vary with moments of inertia of loads driven by a synchronous motor, the pull-in characteristics of the synchronous motor according to the invention will be considered with reference to moments of inertia of loads. FIG. 8 shows the relation between the pull-in torques T$in$ (kg.-cm.) and the moments of inertia GD$^2$ of loads (kg.-cm.$^2$). As shown in FIG. 8, although the pull-in torque decreases as the moment of inertia of a load increases, the pull-in torque is larger than the pull out torque of the known hysteresis motors in the vicinity of synchronous operation even when the moment of inertia of a load increases up to 20 kg.-cm.$^2$. It will be apparent that this pull-in characteristic can be also adjusted so as to be suitable for particular loads by changing the degree of anisotropy in the rotor.

Although, in the embodiment explained above, the ring or cylinder rotor of a magnetic alloy is subjected to the magnetic annealing treatment about its whole length and thus has magnetic anisotropy throughout its length, it will be apparent that only a part of the rotor in the axial direction may be subjected to the magnetic annealing treatment and the other part left to be magnetic isotropic like rotors of known hystersis motors. By this partial treatment, operational characteristics of the synchronous motor such as torque-speed characteristics, pull-in characteristics can be adjusted according to the requirements of a particular application, similarly to the adjustment of the degree of the magnetic anisotropy.

Figure 10:
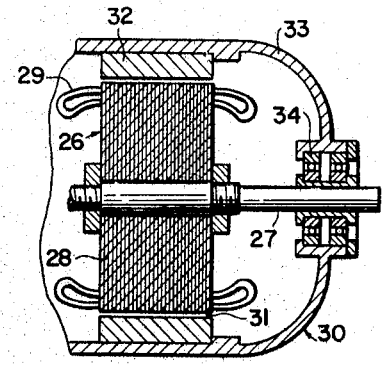
FIG. 10 is a sectional view of another embodiment of the invention.
Figure 11:
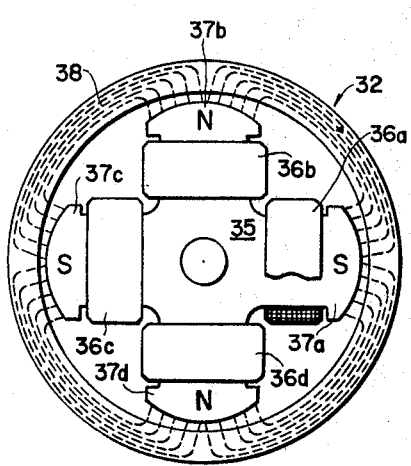
FIG. 11 is an explanatory view of magnetic annealing treatment for manufacturing the rotor of the motor shown in FIG. 10.

FIG. 10 shows a partial sectional view of another embodiment according to the invention in which a rotor surrounds a stator and it rotates therearound together with suitable enclosing means. A stator 26 of an outer rotation type synchronous motor comprises a fixed shaft 27, a stator core 28 composed of tooth-punched laminated iron plates, and poly-phase distributed windings 29. A rotor 30 comprises a ring or cylinder member 32 of magnetic material such as alnico V, and an enclosing member 33 of non-magnetic materail such as aluminum to which the ring member 32 is secured. The rotor is rotatably supported on the shaft 27 by means of bearing means 37. The ring member 32 is secured. The rotor is rotatably supported on the shaft 27 by means of bearing means 37. The ring member 32 is subjected to the magnetic annealing treatment and exhibits magnetic anisotropy around its inner surface in the previously described manner. FIG. 11 illustrates the magnetic annealing treatment employed in the above embodiment in case of a 4 pole machine in which a magnetizing device 35 comprising four poles 37a–37d and magnet coils 36a–36d are disposed within the ring member 32. The center of the magnetizing device 35 is placed at the axis of the ring member 32 so that symmetrical flux distribution around the axis may be obtained.

In the above described embodiments of the invention, the rotors are treated to exhibit magnetic anisotropy so the number of the resultant magnetic saliency areas are equal to the number of stator poles. It is believed apparent, however, that the number of the magnetic saliency areas may be different from that of the stator poles because there is not such physical saliency in the rotor according to this invention as in known reluctance rotors. For example, an A.C. single phase six-pole hystersis motor of a conventional type utilizing a TMK–4C magnet which has a coercive force of $Hc=145$ oersteds and a maximum residual magnetization of $Br=8,000$ (gausses) showed a maximum output of 49 w. and the efficiency of 27%. By substituting a rotor obtained according to the invention in the same manner as explained above with reference to FIG. 3 and having four poles magnetic saliency as shown in FIG. 2 for the TMK–4C magnet, 69 w. output and 30% efficiency was obtained. However, it will be appreciated that from the principle of alternating machines the number of the magnetic saliency may be best selected to be the same as the pole number of a machine.

From the above detailed description it will be appreciated that according to the present invention, a synchronous motor of the hystersis type having a ring or cylinder rotor of considerable coercivity provided with magnetic anisotropy so as to correspond with the number of stator poles, has both the merits of known hysteresis motors and known reluctance motors. As a result, the synchronous motor of the invention has a larger output power and a higher efficiency than known hysteresis motors of the same size and the same construction and has the same low noise characteristics of a hysteresis motor.

Although the invention has been described in connection with certain embodiments and modifications thereof, it should be understood that further modifications may suggest themselves to those skilled in the art, and it is intended to cover any such modifications as fall within the scope of the appended claims.

We claim:

1. In a synchronous motor of the hysteresis type: a stator having a hollow and including a stator winding for producing a rotating magnetic flux in said hollow; and a smooth surface cylindrical member fixedly mounted on a supporting member of nonmagnetic material for rotation within the hollow of the stator in concentric relationship with the stator and defining an annular air gap with the stator; said rotating magnetic flux having a predetermined member of angularly displaced radial polarity centers, the improvement being characterized in that said smooth surface cylindrical member is composed of hysteresis magnetic material having such anisotropy that substantially all of the easy magnetization axes of the magnetic domains in at least a peripheral portion of the cylindrical member are arranged along predetermined directions so as to produce at least a pair of magnetic saliencies having diametrically opposite directions in the cylindrical member, thereby presenting a path of easy travel for magnetic flux produced by the stator winding.

2. A synchronous motor of the hysteresis type according to claim 1, wherein the easy magnetization axes of magnetic domains in the vicinity of at least a pair of diametrically opposite points on the peripheral portion of the cylindrical member are arranged along the radial direction and other easy magnetization axes on at least the peripheral portion between said diametrically opposite points are arranged along circumferential directions in order to provide magnetic saliency in the cylindrical member.

3. A synchronous motor of the hysteresis type according to claim 1, wherein substantially all the easy magnetization axes in at least the peripheral portion of the cylindrical member are arranged in such a manner that at least two pairs of magnetic saliencies are positioned at diametrically opposite points on the cylindrical member and the easy magnetization axes in the portion of the plural magnetic saliencies are magnetically coupled with each other by the easy magnetization axes arranged along the circumferential direction of the cylindrical member, thereby presenting a path of easy travel for magnetic flux produced by the stator winding.

4. A synchronous motor of the hysteresis type according to claim 3, wherein the majority of said easy magnetization axes of magnetic domains are placed in a circular direction of the cylindrical member and the easy magnetization axes in the vicinity of the plural magnetic saliencies at diametrically opposite points on the outer periphery of the cylindrical member are disposed in the radial direction and said plural magnetic saliencies are provided symmetrically around the axis of the cylindrical member.

5. In a synchronous motor of the hysteresis type: a casing of non-magnetic material having a hollow and being rotatably mounted on a shaft member by bearing means; a cylindrical member having a smooth inner surface and being fixed on an inner surface of said casing; and a stator fixed on said shaft member and including a stator winding for producing a rotating magnetic flux in said cylindrical member in concentric relationship with the stator and defining an annular air gap with the inner surface of the cylindrical member; said rotating magnetic flux having a predetermined number of angularly displaced radial polarity centers, the improvement being characterized in that the cylindrical rotor is composed of hysteresis magnetic material having such anisotropy that a portion of the easy magnetization axes of magnetic domains in at least inner peripheral portion of the cylindrical member are arranged inwardly along the radial direction and other portion in at least the inner peripheral portion are arranged along the circular direction of the cylindrical member in order to produce at least a pair of magnetic saliencies being positioned diametrically opposite direction of the cylindrical member, thereby presenting a path of magnetic flux produced by the stator winding.

6. A synchronous motor of the hysteresis type according to claim 5, wherein substantially all the easy magnetization axes in at least inner surface portion of the cylindrical member are arranged in such a manner that at least two pairs of magnetic saliencies are positioned at diametrically opposite parts of the cylindrical member and the easy magnetization axes oriented to the particular directions are magnetically coupled with each other by the easy magnetization axes arranged in the portion of the plural magnetic saliencies.

7. A synchronous motor of the hysteresis type according to claim 3, wherein the easy magnetization axes are arranged in such a manner that the plural magnetic saliencies are positioned in order to functionally correspond with salient poles in reluctance motor.

8. A synchronous motor of the hysteresis type according to claim 6, wherein the easy magnetization axes are arranged in such a manner that the plural magnetic saliencies are positioned in order to functionally correspond with salient poles in reluctance motor.

9. A synchronous motor of the hysteresis type according to claim 6, wherein a majority of said easy magnetization axes of magnetic domains are oriented in the circumferential direction of the cylindrical member and easy magnetization axes in the vicinity of the plural magnetic saliencies of a diametrically opposite direction on the inner periphery of the cylindrical member are oriented in the radial direction and said plural magnetic saliencies are provided symmetrically around the axis of the cylindrical member.

10. A synchronous motor of the hysteresis type according to claim 1, wherein said hysteresis magnetic material of said cylindrical member has a coercivity of less than 300 oersteds.

11. A synchronous motor of the hysteresis type according to claim 1, wherein the coercivity of said hysteresis magnetic material is weaker than the field strength in said material produced by said stator winding.

References Cited

UNITED STATES PATENTS

| | | | |
|---|---|---|---|
| 2,295,082 | 9/1942 | Jonas | 310—152 |
| 2,578,407 | 12/1951 | Ebeling | 310—152 |
| 2,803,765 | 8/1957 | Timmerman | 310—156 |
| 2,912,609 | 11/1959 | Kassner | 310—156 |
| 3,038,092 | 6/1962 | Bekey | 310—261 |
| 3,068,373 | 12/1962 | Bekey | 310—162 |
| 3,124,733 | 3/1964 | Andrews | 310—156 |

FOREIGN PATENTS

| | | |
|---|---|---|
| 1,092,113 | 11/1960 | Germany. |
| 1,118,335 | 11/1961 | Germany. |

ORIS L. RADER, Primary Examiner

L. L. HEWITT, Assistant Examiner

U.S. Cl. X.R.

310—265